United States Patent
Fieau et al.

(10) Patent No.: US 12,004,076 B2
(45) Date of Patent: Jun. 4, 2024

(54) EVALUATING A HOSTING DEVICE FOR INSTALLATION OF A VIRTUALIZED FUNCTION WITHIN A NETWORK INFRASTRUCTURE

(71) Applicant: ORANGE, Issy les Moulineaux (FR)

(72) Inventors: Frédéric Fieau, Chatillon (FR); Gaël Fromentoux, Chatillon (FR); Emile Stephan, Chatillon (FR)

(73) Assignee: ORANGE, Issy les Moulineaux (FR)

(*) Notice: Subject to any disclaimer, the term of this patent is extended or adjusted under 35 U.S.C. 154(b) by 358 days.

(21) Appl. No.: 17/434,193

(22) PCT Filed: Feb. 17, 2020

(86) PCT No.: PCT/FR2020/050283
§ 371 (c)(1),
(2) Date: Aug. 26, 2021

(87) PCT Pub. No.: WO2020/174156
PCT Pub. Date: Sep. 3, 2020

(65) Prior Publication Data
US 2022/0174588 A1 Jun. 2, 2022

(30) Foreign Application Priority Data
Feb. 27, 2019 (FR) ...................................... 1902037

(51) Int. Cl.
*H04W 48/18* (2009.01)
*G06F 9/455* (2018.01)
*H04W 24/08* (2009.01)

(52) U.S. Cl.
CPC ........ *H04W 48/18* (2013.01); *G06F 9/45558* (2013.01); *H04W 24/08* (2013.01); *G06F 2009/45595* (2013.01)

(58) Field of Classification Search
CPC ... H04W 48/18; H04W 24/08; G06F 9/45558; G06F 2009/45595; G06Q 20/14;
(Continued)

(56) References Cited
U.S. PATENT DOCUMENTS

2015/0326448 A1* 11/2015 Chaudhary ............ G06Q 30/04
705/40
2017/0104609 A1* 4/2017 McNamee .............. H04W 4/24
(Continued)

OTHER PUBLICATIONS

WO 2019/119437 A1 (Year: 2019).*
(Continued)

*Primary Examiner* — Rushil P. Sampat
(74) *Attorney, Agent, or Firm* — David D. Brush; Westman, Champlin & Koehler, P.A.

(57) ABSTRACT

A method for determining a hosting device of a network infrastructure of an operator for the installation of a virtualized function. The virtualized function contributes to transmission and processing of at least one item of information relating to a service. The method is implemented by a management entity of the infrastructure and includes: transmitting to a virtualization entity a compatibility request including at least one datum relating to a test of a resource of the hosting device; receiving from the virtualization entity at least one first variable derived from the test, relating to the transmitted datum, executed on the resource; and determining an aptitude of the hosting device to accommodate the virtualized function as a function of the at least one first variable received.

14 Claims, 4 Drawing Sheets

Figure 1:
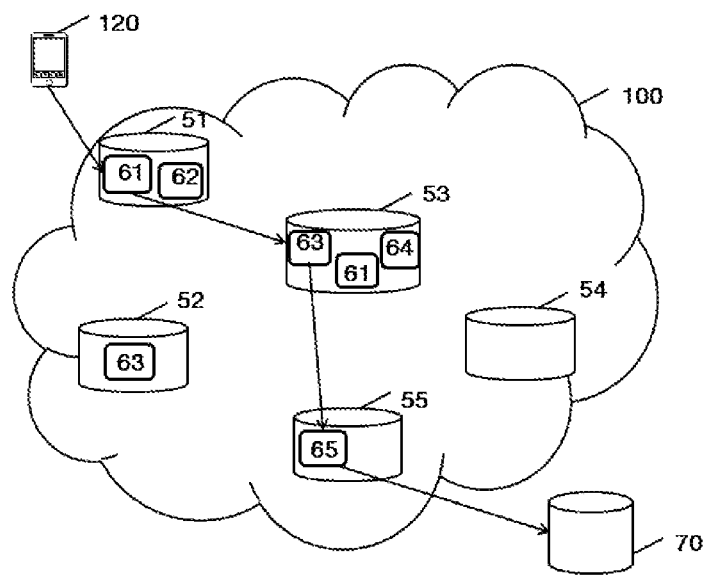

(58) Field of Classification Search
CPC . G06Q 30/04; H04L 41/5041; H04L 41/5054; H04L 41/5096
See application file for complete search history.

(56) References Cited

U.S. PATENT DOCUMENTS

| | | |
|---|---|---|
| 2018/0095802 A1 | 4/2018 | Nguyen et al. |
| 2019/0058633 A1* | 2/2019 | Chapalamadugu ......................... H04L 41/0853 |
| 2020/0076709 A1* | 3/2020 | Stenberg ............. H04L 41/5025 |
| 2021/0091967 A1* | 3/2021 | Wang .................. H04L 12/1403 |
| 2021/0144056 A1* | 5/2021 | Chakrapani Rangarajan .............. H04L 41/5012 |

OTHER PUBLICATIONS

WO 2018/167537 A1 (Year: 2018).*
International Search Report dated May 25, 2020 for corresponding International Application No. PCT/FR2020/050283, dated Feb. 17, 2020.
Written Opinion of the International Searching Authority dated May 25, 2020 for corresponding International Application No. PCT/FR2020/050283, filed Feb. 17, 2020.
International Preliminary Report on Patentability and English translation of the Written Opinion, dated Jun. 4, 2020 for corresponding International Application No. PCT/FR2020/050283, dated Feb. 17, 2020.
Bari, M. F., et al., "On orchestrating virtual network functions", In Network and Service Management (CNSM), Nov. 2015, 11th International Conference on (pp. 50-56).

* cited by examiner

EVALUATING A HOSTING DEVICE FOR INSTALLATION OF A VIRTUALIZED FUNCTION WITHIN A NETWORK INFRASTRUCTURE

CROSS-REFERENCE TO RELATED APPLICATIONS

This Application is a Section 371 National Stage Application of International Application No. PCT/FR2020/050283, filed Feb. 17, 2020, which is incorporated by reference in its entirety and published as WO 2020/174156 A1 on Sep. 3, 2020, not in English.

1. TECHNICAL FIELD

The invention relates to telecommunications networks implemented on the basis of virtualized architectures. The invention aims to improve the deployment of virtualized functions in an infrastructure by ensuring that the infrastructure has sufficient capabilities to allow the deployment of virtualized functions that have diverse characteristics and demands.

2. STATE OF THE ART

The telecommunications sector, and more globally the infrastructures handling the terminal and application communications, lies at the heart of a digital transformation which is based on emerging technologies such as the virtualization of network functions (VNF—Virtual Network Functions) consisting in uncoupling the network function from the dedicated physical equipment to deploy the network functions in storage spaces, or the Cloud, in a more or less distributed fashion and relying on generic servers. The virtualization considered in the application refers equally to the virtualization technique, that is to say to the installation of a virtual machine comprising an operating system on a server, and to the technique consisting in installing a virtual instance or container on a server, an operating system being shared between containers on the server.

A virtual network function (VNF) is configured to be a set of software components (VNFc—Virtual Network Function Component), each component of which must be executed on a server such as a virtual (VMs—Virtual Machines), or a container within the so-called virtualized architecture. Hereinafter in the document, the term virtual machine also includes the term container. The deployment of a network service established on the basis of VNFs therefore consists in placing the various components of the VNFs in virtual machines that have the resources needed for the execution of the VNFs and, consequently, for the service to be implemented well. These resources, whether they be computation, storage and memory resources or network resources, are supplied by the infrastructure hosting these virtual machines/containers.

The deployment of the network services, to clients of the operator of a telecommunications network or for the operator itself, consequently entails the placement of virtual instances of functions (also called virtual functions or VNFs) in VMs (or containers), which corresponds to the issue of placement of the VMs in the architectures based on "Cloud computing", but with new constraints added by the specific context of a telecommunications architecture.

These constraints are for example as follows: some network functions exhibit strong constraints in terms of latency and must consequently be deployed as close as possible to the user of the services relying on these functions. These constraints have prompted the telecommunications operators to review their infrastructures to address these demands, by massively distributing their data centers to be present in sites positioned at the network edge, commonly called points of present (POP). This distribution of the network functions makes it possible to offer an enhanced quality of service for the end users and to address the strict demand of certain network functions, for example the functions relating to the radio access network (RAN). These data centers distributed at the network edge have limited capacities in terms of resources (computation, storage and network resources), notably by comparison to the large data centers deployed by the main actors of the applications ecosystem.

Approaches for addressing the issue of deployment of VNFs such as the ILP (Integer Linear Programming) optimization techniques (Bari, M. F., Chowdhury, S. R., Ahmed, R., & Boutaba, R. (2015, November), On orchestrating virtual network functions, In Network and Service Management (CNSM), 2015 11th International Conference on (pp. 50-56)) have been proposed but these techniques that give exact placement plans by optimizing multiple criteria (costs, energy consumption, etc.) suffer from a number of inadequacies, including:

- the solution addresses a problem of deployment of VNFs. Now, an operator may want to have reliable and sufficiently recent data as to the capabilities of servers deployed in an architecture, independently of the need associated with the installation of a virtual function on a server,
- a problem of scalability: in fact, solving the problem for a massively distributed infrastructure may take hours, which does not address the demand for low latency of a virtualized architecture in the telecommunications field,
- a problem of information reliability: the placement is performed on the basis of a mapping founded on the declared capabilities of the infrastructure which may be obsolete, not suited to the placement criteria for the virtualized function to be deployed.

The placement of the virtualized functions relies, according to the prior art, on information transmitted by an entity responsible for managing the infrastructure to a controller, responsible for the placement. Such information is declarative and possibly not suited to the characteristics of the virtualized function to be deployed. Furthermore, notably in the case where the infrastructure is managed by an entity distinct from the entity managing the placement of the virtualized function, the management entity of the infrastructure may transmit information that is incomprehensible for the entity responsible for the placement and even transmit unreliable information. That can occur for example if the entity responsible for the infrastructure wants to use its resources to the maximum and, for example, practices overbooking of resources. That can lead to VNFs being deployed on virtual machines that are not prepared or suited to the type of VNFs and, consequently, to a lesser quality of service offered from the VNFs.

The object of the present invention is to provide enhancements over the state of the art.

3. SUMMARY OF THE INVENTION

The invention improves the situation using a method for determining a hosting device of a network infrastructure of an operator for the installation of a virtualized function, said virtualized function contributing to the transmission and the processing of at least one item of information relating to a service, the method being implemented by a management entity of said infrastructure and comprising:

the transmission to a virtualization entity of a compatibility request comprising at least one datum relating to a test of a resource of the hosting device, the reception from the virtualization entity of at least one first variable deriving from the test, relating to the transmitted datum, executed on the resource, the determination of the aptitude of the hosting device to accommodate the virtualized function as a function of the at least one first variable received.

The determination method makes it possible to be able to check that a virtual machine or a container or a server or any other device capable of hosting a virtualized function is capable of accommodating a virtualized function. When a virtualized function might be installed on a hosting device of a physical infrastructure, a management entity, which may for example be equipment of VIM (Virtual Infrastructure Manager) type, transmits a datum relating to a test or data relating to several tests making it possible to be able to establish that a hosting device, such as a virtual machine or a container of a service or even a server, is capable of accommodating the virtualized function. The data relating to a test may be a test, a test identifier or even a test algorithm or an executable file allowing the test to be run. If the hosting device is actually capable, the virtualized function is likely to be able to be installed on this hosting device. This for example involves comparing the values of placement test results, obtained with respect to a virtualized function to be installed, to then determine if the hosting device can be sufficiently capable of accommodating a virtualized function. The test performed with respect to a virtualized function makes it possible on the one hand to be able to check that a hosting device has capacities which may have been declared previously to the management entity but also be able to check that a virtual machine has sufficient capacities for a given virtualized function by testing resources associated with the needs and the characteristics of the virtualized function. Furthermore, in the case where several hosting devices are tested, it is possible to select the device for which the received variables correspond most to reference values or by selecting the hosting device that has the variables most suited to the virtualized function which is likely to be installed. The sending and the execution of a datum relating to a test upstream of the installation of a virtualized function makes it possible to guarantee the effective compatibility of the hosting device for a future installation of the virtualized function and to update or complement the tests by exploiting preceding tests and installations of virtualized functions already performed in the communication infrastructure. It should be noted that the method can be implemented in the absence of any need for installation, notably to obtain an inventory of the hosting devices present in the physical infrastructure, and also their capacities, independently of or in addition to the descriptions possibly received.

According to one aspect of the invention, the determination method further comprises the obtaining of at least one second variable from an evaluation of at least one capacity required for the installation of the virtualized function.

The management entity can execute an evaluation of capacities making it possible to be able to obtain variables that it will be able to compare with variables transmitted by the virtualization entity following the execution of the same tests relating to a virtual machine. This evaluation makes it possible to be able to determine theoretical values required for the installation of a virtualized function on a hosting device. Thus, the results of the tests performed by the virtualization entity will be able to be compared with the results of the evaluation. The advantage of performing such an evaluation makes it possible to be able to adapt the determination to installation conditions that may be modified according to the infrastructure or even according to the modifications of the virtualized function likely to be installed.

According to another aspect of the invention, in the determination method, the at least one second variable comprises a duration T1 corresponding to a duration of execution of the evaluation.

Some virtualization functions require low latency times. The object of the evaluation is notably to check that a hosting device, on which a virtualized function will possibly be installed, comprises the resources needed to observe the required latency. The management entity will be able to determine if a hosting device is suitable for a virtualized function to be installed on this device by having, as reference, a duration T1 corresponding to a theoretical duration to be observed for the execution of the test, the duration T1 relating for example to the latency time to be observed by the virtualized function for a given operation.

According to another aspect of the invention, in the determination method, the at least one datum relating to a test is previously obtained from a control entity of the virtualized function.

The control entity of a virtualized function to be deployed can advantageously transmit the placement test for the management entity. The management of the tests by the control entity, which may have obtained them previously from another entity, for example an entity of NFVO (NFV Orchestrator) type makes it possible to guarantee that the tests to be implemented on the virtual machine are well suited to a precise virtualized function, the control entity of the virtualized function checking that the tests effectively correspond to a virtualized function or to a same type of virtualized function.

According to another aspect of the invention, in the determination method, the at least one datum relating to a test is specific to at least one characteristic of the virtualized function.

Since the number of virtualized functions in a physical infrastructure is potentially fairly great and these virtualized functions have requirements concerning different hosting devices, it is advantageous to provide tests according to characteristics of a virtualized function. Thus, two virtualized functions for which a low latency time must be observed will be able to require the same test to select a hosting device on which one and/or the other of these functions will be able to be installed.

According to another aspect of the invention, in the determination method, the resource of the hosting device relates to a storage space.

Before considering the installation of a virtualized function, it is necessary to check that the hosting device has sufficient capacities in terms of storage space or of memory space to install the virtualized function. In fact, the virtual machine capacity information which has possibly been communicated previously to the management entity may not be up to date, notably if virtualized functions have been installed or uninstalled since the information was received. The test performed upon the actual installation of the virtualized function or inadvertently or regularly to establish a mapping of the resources of the hosting devices, therefore makes it possible to avoid a failure of the installation of a virtualized function for want of memory space or else update the information on the hosting devices of an infrastructure. Memory space can notably be a critical resource for a virtualized function of the user plane, such as a S-GW (Serving Gateway), a P-GW (Packet Gateway) or a BNG (Broadband Network Gateway).

According to another aspect of the invention, in the determination method, the resource of the hosting device relates to a computation capacity.

A computation capacity is particularly important for the network control entities such as an MME (Mobility Management Entity) or PCRF (Policy Control and Rules Function) entity. This computation capacity is also particularly important for equipment of Firewall type. It therefore seems important to evaluate the capabilities in terms of computation capacity of the hosting device where a virtualized MME, PCRF or Firewall function in particular will possibly be installed.

The various aspects of the determination method which have just been described can be implemented independently of one another or in combination with one another.

The invention relates also to a method for examining a resource of a hosting device of a network infrastructure of an operator with a view to the installation of a virtualized function, said virtualized function contributing to the transmission and the processing of at least one item of information relating to a service, the method being implemented by a virtualization entity of said infrastructure and comprising:
  the reception from a management entity of the infrastructure of a compatibility request comprising at least one datum relating to a test of the resource,
  the execution on the resource of the at least one test relating to the received datum allowing at least one first variable to be obtained,
  the transmission to the management entity of the at least one first variable.

According to another aspect of the invention, in the examination method, the at least one first variable comprises a duration T2.

The virtualization entity calculates the duration during which the test was performed. The test to be performed is selected to determine if the hosting device is capable of accommodating a virtualized function and the duration of execution of the test, therefore the time taken to reach a result, can also be relevant information for evaluating the compatibility of the virtual machine with the requirement of the virtualized function. The management entity, on reception of the duration T2, can thus compare it to the duration T1 in the case where a theoretical time has been determined by the management entity.

The various aspects of the examination method which have just been described can be implemented independently of one another or in combination with one another.

The invention relates also to a device for determining a hosting device of a network infrastructure of an operator for the installation of a virtualized function, said virtualized function contributing to the transmission and the processing of at least one item of information relating to a service, comprising:
  a transmitter, capable of transmitting to a virtualization entity a compatibility request comprising at least one datum relating to a test of a resource of the hosting device,
  a receiver, capable of receiving from the virtualization entity at least one first variable deriving from the test, relating to the transmitted datum, executed on the resource,
  a determination module, capable of determining the aptitude of a hosting device to accommodate the virtualized function as a function of the at least one first variable received.

This device, capable in all its embodiments of implementing the determination method which has just been described, is intended to be implemented in a management entity of a communications infrastructure, such as a virtualized infrastructure. For example, the device can be implemented in an entity of VIM type.

The invention relates also to a device for examining a resource of a hosting device of a network infrastructure of an operator with a view to the installation of a virtualized function, said virtualized function contributing to the transmission and the processing of at least one item of information relating to a service, comprising:
  a receiver, capable of receiving from a management entity of the infrastructure a compatibility request comprising at least one datum relating to a test of the resource,
  an execution module, capable of executing on the resource the at least one test relating to the received datum allowing at least one first variable to be obtained,
  a transmitter, capable of transmitting to the management entity the at least one first variable.

This device, capable in all its embodiments of implementing the examination method which has just been described, is intended to be implemented in a hosting resource management entity such as a hypervisor or a virtual machine and/or container administration entity.

The invention relates also to a system for determining a hosting device of a network infrastructure of an operator for the installation of a virtualized function, said virtualized function contributing to the transmission and the processing of at least one item of information relating to a service, comprising:
  a determination device,
  an examination device,
  at least one hosting device.

The invention relates also to a computer program comprising instructions for the implementation of the steps of the determination method which has just been described, when this program is run by a processor and a storage medium that can be read by a determination device on which the computer program is stored.

The invention relates also to a computer program comprising instructions for the implementation of the steps of the examination method which has just been described, when this program is run by a processor and a storage medium that can be read by an examination device on which the computer program is stored.

These programs can use any programming language, or be in the form of source code, object code or an intermediate code between source code and object code, such as in a partially compiled form, or in any other desirable form.

The invention also targets an information medium that can be read by a computer, and comprising instructions of the computer programs as mentioned above.

The information medium can be any entity or device capable of storing the programs. For example, the medium can comprise a storage means, such as a ROM, for example a CD ROM or a microelectronic circuit ROM, or even a magnetic storage means, for example a hard disk.

On the one hand, the information medium can be a transmissible medium such as an electrical or optical signal, which can be conveyed by an electrical or optical cable, wirelessly or by other means. The programs according to the invention can in particular be downloaded over a network of Internet type.

Alternatively, the information medium can be an integrated circuit in which the programs are incorporated, the circuit being adapted to execute or be used in the execution of the methods concerned.

4. BRIEF DESCRIPTION OF THE DRAWINGS

Figure 2A:
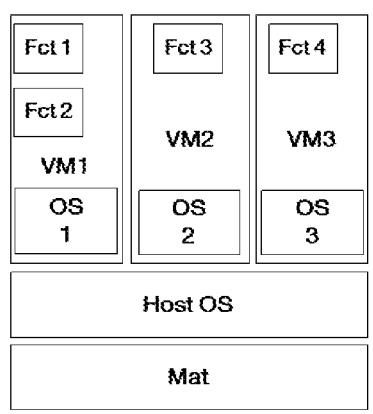
Figure 2B:
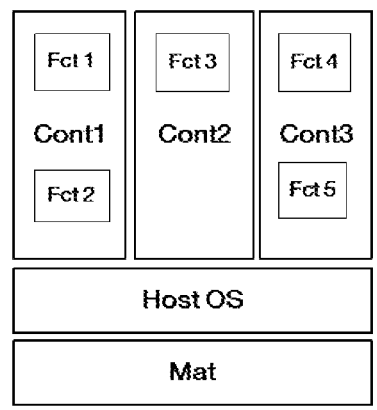
Figure 3:
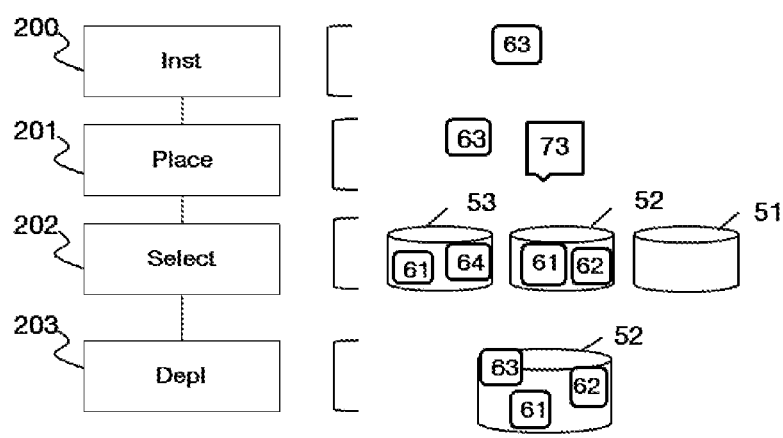
Figure 4:
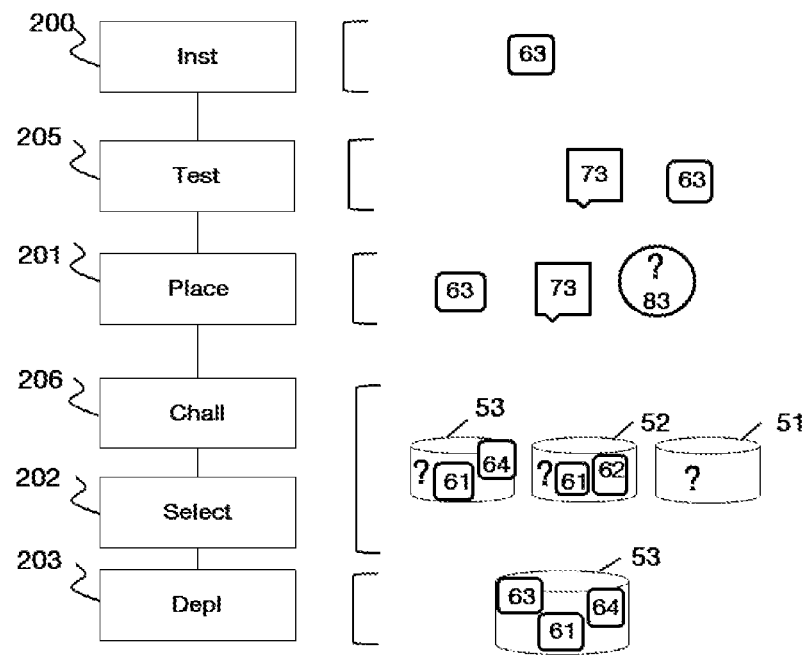
Figure 5:
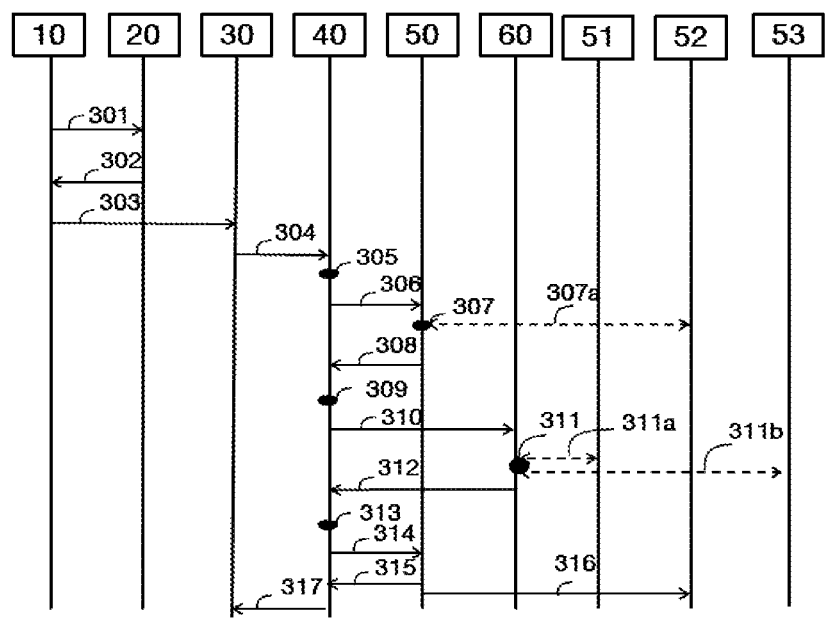
Figure 6:
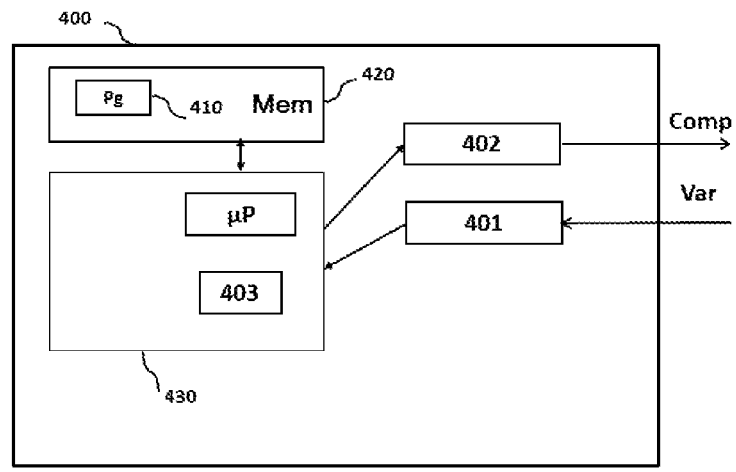
Figure 7:
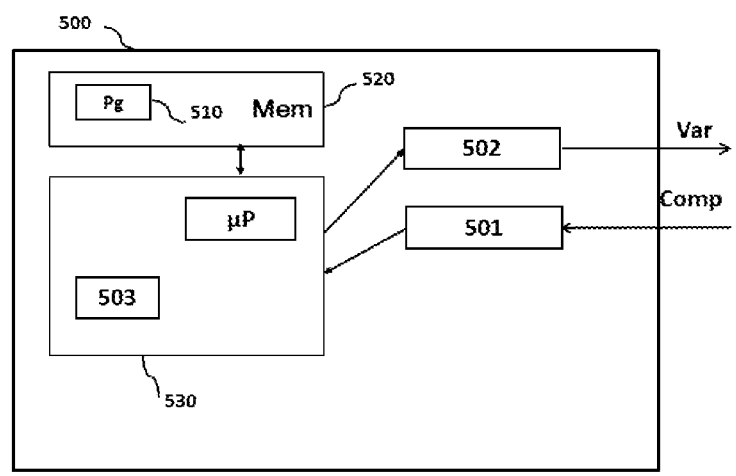

Other features and advantages of the invention will become more clearly apparent on reading the following description of particular embodiments, given as simple illustrative and nonlimiting examples, and the attached drawings, in which:

FIG. 1 presents a simplified view of a communication infrastructure in which the invention is implemented according to one aspect of the invention, FIG. 2*a* presents a first hosting device capable of accommodating a virtualized function according to one aspect of the invention, FIG. 2*b* presents a first hosting device capable of accommodating a virtualized function according to one aspect of the invention, FIG. 3 presents an overview of the method for determining a hosting device according to a prior art technique, FIG. 4 presents an overview of the method for determining a hosting device according to a first embodiment of the invention, FIG. 5 presents an overview of the method for determining a hosting device according to a second embodiment of the invention, FIG. 6 presents an example of structure of a determination device according to one aspect of the invention, FIG. 7 presents an example of structure of an examination device according to one aspect of the invention.

5. DESCRIPTION OF THE EMBODIMENTS

Hereinafter in the description, embodiments of the invention are presented in a communication infrastructure. This infrastructure can be implemented to route communication data to fixed or mobile terminals and the invention can be intended for the installation of the virtualized functions used for the routing and/or the processing of residential or enterprise customer data.

Reference is made first of all to FIG. 1 which presents a simplified view of a communication infrastructure in which the invention is implemented according to one aspect of the invention.

A terminal 120, fixed or mobile, transmits and receives data to or from a data server 70. The server 70 can equally be a web server, a DNS (Domain Name Server) server, a DHCP (Dynamic Host Configuration Protocol) server, an FTP (File Transfer Protocol) server or any other server transmitting data to the terminal 120. The data are routed between the terminal 120 and the server 70 by using devices of a communication infrastructure 100. The devices can be physical equipment responsible for performing functions (routers, servers, etc.) and/or virtualized functions installed on virtual machines or containers in service. Thus, a routing function can be equally satisfied by a physical device such as a router or a virtualized routing function installed on a virtual machine of a server. The data between the terminal 120 and the server 70 are routed via the functions 61, 63 and 65 respectively installed on hosting devices 51, 53 and 55 such as virtual machines or containers supported by servers.

It can be seen that one and the same server can accommodate several functions as is the case for example for the server 53 which accommodates the functions 63, 61, 64 installed on one and the same virtual machine or distinct virtual machines. One and the same function can, moreover, be installed on two distinct servers, for example to improve the availability of the function and the processing of the data performed by this function. For example, the function 61 is deployed on the server 51 and on the server 53. The routing of the data between the terminal 120 and the server 70 is performed by chaining the functions, which amounts to creating a data graph between the terminal 120 and the server 70. It should be noted that the respective servers 51, 52, 53, 54, 55 can be administered by different entities or can be located at different points, in proximity to the client 120 or the server 70, notably to make it possible to take account of the constraints of the functions, notably in terms of latency, implemented in the servers. The servers can thus be installed in centralized or distributed "Cloud" type spaces. The functions 61, 62, 63, 64, 65 can handle the routing of the data and/or handle processing on these data. Thus, the functions can be routing functions, functions relating to a mobile network such as S-GW (Serving Gateway), P-GW (Packet Data Network Gateway), MME (Mobility Management Entity), or else processing functions such as Firewall, Web Optimization, DPI (Deep packet Inspection), etc. The communication infrastructure 100 is simplified and can further comprise administration devices of the infrastructure, a great number of functions and of servers. Likewise, data can be routed by using the resources of several communication infrastructures such as the infrastructure 100.

In relation to FIGS. 2A and 2B, hosting devices capable of accommodating a virtualized function are presented according to aspects of the invention.

FIG. 2A refers to the virtualization technique while FIG. 2B refers to the containerization technique. These two types of techniques, not exclusive, can equally be used to install functions. In FIG. 2A, concerning the virtualization technique, the functions Fct 1 and Fct 2 are installed in a virtual machine VM1. The virtual machine VM1 has its own operating system OS1. The server on which the virtual machine VM1 is installed is provided with its own operating system "host OS" and hardware components "Mat". Thus, the three virtual machines VM1, VM2, VM3 comprise their own operating systems, namely OS1, OS2, OS3, and, on these virtual machines, the functions Fct 1, Fct 2, Fct 3, Fct 4 are installed. In this case, a hosting device can be one of the virtual machines or else the server on which the three virtual machines VM1, VM2, VM3 are installed.

FIG. 2B refers to the containerization technique. The server of FIG. 2B comprises the hardware components Mat, the host OS and the three containers Cont1, Cont2 and Cont3. These containers, unlike the virtual machines presented in FIG. 2A, do not comprise operating systems specific to the containers. The containers use the shared operating system OS Host, offered by the server. It should be noted that the server comprising the containers can also have an adaptation interface between the host OS and the containers. The functions are installed in the containers. As indicated in FIG. 2B, the functions Fct 1 and Fct 2 are collocated in the container Cont1, while the function Fct 3 is installed in the container Cont2. The functions Fct 4 and Fct 5 are installed in the container Cont3. In this case, the hosting devices are both the respective containers Cont1, Cont2, Cont3 and the server comprising these containers. It should be noted that these examples presented in FIGS. 2A and 2B are not exclusive. Notably, it is possible to envisage servers comprising both virtual machines and containers.

Reference is now made to FIG. 3 which presents an overview of the method for determining a hosting device according to a prior art technique.

According to a prior art, four steps 200, 201, 202 and 203 are identified to install a function in a hosting device. In the step 200, an administration entity sends a request to an orchestration entity for the installation of a function 63. This installation request can be implemented to satisfy a new service intended to a client, or to support an excessive load observed on a function already deployed, and concerning the need to replicate this function, or for an update of a service implemented by an operator for example to respond, for example, to a service quality and/or security problem. Various reasons can thus lead the administration entity to request the installation of a new function 63. In this example, the administration entity transmits this installation request in the step 200 to an orchestration entity responsible for the network services. The installation request can optionally comprise information relating to the function such as information relating to the services implemented from this function 63, even requirements in terms of quality of service to be supported for the function 63. The installation request can further comprise a localization parameter corresponding to a zone of the network that allows its constraints in terms of latency to be observed. Thus, a zone of availability can thus be transmitted to complement the function 63.

The orchestration entity, based on the information received in the step 200, determines, in the step 201, the placement requirements of the function for the services using this function to be offered with a sufficient quality and to comply with the localization information possibly received. The orchestration entity thus defines the placement requirements 73 for the function 63. These requirements can correspond to needs for storage space, for computation capacities, latency, etc.

Furthermore, in this step 201, the orchestration entity transmits the function 63 the placement request comprising the requirements 73 to a control entity of the function 63.

The control entity, based on the information received from the orchestration entity, must proceed, in the step 202, to select a hosting device of the infrastructure that meets the requirements indicated. In order to be able to select a hosting device that is suited to the requirements, an entity responsible for the infrastructure can assist the control entity, for example by comparing the information from the control entity with the data that it holds on the hosting devices of the communication infrastructure. According to the prior art, the control entity has declarative information on the servers 53, 52, 51 or on virtual machines installed on these servers of the communication infrastructure and does not test the accuracy of the information received for the installation, or the instantiation, of the function 63. The control entity can hold information on the servers or on the virtual machines or containers deployed on the servers. Thus, in the example, the control entity knows that the server 53 or that a virtual machine of the server 53 comprises the functions 61, 64 and it also obtains the characteristics of the server 53 from a virtual machine on the server 53 possibly obtained from the entity responsible for the infrastructure. It also knows that the server 52 hosts the functions 61 and 62 and that the server 51 does not host any function. The control entity has only the declared information, in a format specific to the entity which transmitted it to it and it does not check the accuracy of this information. Based on this information, the control entity selects the hosting device 52 and installs the function 63 on this device 52 or on a virtual machine of this device 52 in the step 203.

According to this example, the control entity has possibly installed, possibly via the support of an entity responsible for the infrastructure comprising the server 52, a function in a hosting device which was no longer suitable, because the information declared on the servers of the infrastructure was not up to date or was not fully comprehensible for the control entity. Furthermore, the control entity does not have reliable information on the hosting devices, independently of the installation action, rendering any operation of updating of a function, of moving of a function or even of deletion of a function, possibly inefficient.

In relation to FIG. 4, an overview is presented of a method for determining a hosting device according to the first embodiment of the invention.

The step 200 is equivalent to the step 200 in FIG. 3.

In the step 205, the orchestration entity requests a test corresponding to the function 63 to be installed. This request can be transmitted to specific equipment responsible for the management of the tests or else to an existing entity taking over the tests. The test is intended to evaluate the capabilities of a hosting device, therefore a server, a virtual machine or a container, to be able to accommodate the function 63 to be installed. The orchestration entity transmits an identifier or a type of function and also the characteristics 73 necessary to the installation of the function 63, possibly received in the step 200 from the administration entity or else determined by the orchestration entity as a function notably of the service or services implemented from the function. Knowing that the functions to be deployed in an infrastructure are possibly very numerous and diverse, it may be appropriate to determine tests by type of function rather than function so as to limit the number of tests and facilitate the management thereof. Thus, control functions of a mobile network (PCRF (Policy Control and Rules Function), MME, HSS (Home Subscriber Server)) will be able to correspond to one and the same test and the functions linked to the user plan will be able to correspond to another type of test. The test can thus relate to one or more characteristics of the function such as the latency, the routing performance, the processing delay than on the virtualized functions being installed. The orchestration entity obtains the test 83 corresponding to the virtualized function 63, or to the type of the function 63 to be installed. The test 83 is therefore specific to the function or to the type of function to be installed and to the environment in which the function is to be installed, using the characteristics 73 required for the installation of the function 63. The orchestration entity, according to one alternative, obtains a test identifier or any datum relating to a test that makes it possible to be able to effectively associate the datum relating to the test to a test.

In the step 201, the orchestration entity transmits to a control unit, then a management entity of the infrastructure, the placement request comprising the characteristic 73 and the test 83 obtained in the step 205 to a control entity of the function 63. According to one alternative, the orchestration entity transmits the test, or else a test identifier, or else an algorithm or even an executable file or any datum relating to a test and that makes it possible to associate a test or a type of test to the datum.

The step 202 of selection of a hosting device for the installation of the function 63 is preceded by a hosting device challenge step 206. In this challenge step 206, the control entity invokes a management entity of a communication infrastructure for the different hosting devices capable of accommodating the function 63. To limit the number of devices to be tested, the control entity can optionally use the declarative information obtained previously, making it possible to establish a preliminary sort and limit the number of hosting devices to be evaluated. The three hosting devices 51, 52, 53 are tested by applying the test 83. The management entity, invoked by the control entity, can thus select, in the step 202, the hosting device for which the test results are best suited to the function 63. This test performed on the hosting devices therefore makes it possible to improve the relevance of the hosting device selected for the installation of the function by having up-to-date information on the hosting devices and by having information suited to the function or to the characteristics of the virtualized function to be installed. This method implemented for the installation can also be used independently of the installation of the function, for example to establish an inventory of a communication infrastructure from the point of view of a possibly diverse set of functions. In the step 203, the function 63 is installed in the server 53 selected in the selection step 202, following the performance of the test 83 on the three servers 51, 52, 53 of the communication infrastructure.

In relation to FIG. 5, an overview is presented of the method for determining a hosting device according to a second embodiment of the invention. In step 301, an orchestration entity 10 transmits, to a test management entity 20, a request to test a resource of a hosting device for the installation of a virtualized function. This test request relates to a virtualized function which might have previously been requested of the orchestration entity 10 by a services and/or networks administration entity, such as an OSS/BSS (Operation Support System/Business Support System) entity to improve the provision of a service and/or to enrich a service offered to a client. Hereinafter in the overview, it is considered, by way of example, that it is a function of P-GW type to be implemented in the communication infrastructure. The test request comprises an identifier of the P-GW function allowing the test management entity 20 to identify one or more tests corresponding to the function. The request can also comprise characteristics relating to the P-GW function such as, for example, the data rate to be supported, the number of simultaneous data sessions to be supported, the needs in terms of session decryption such that tests of hosting devices that are best suited are effectively determined by the entity 20.

Upon the reception of this request, the test management entity 20 selects a test corresponding to the P-GW function or else corresponding to a set of functions of the same type as P-GW. For example, to simplify the management of the tests, the entity 20 can associate one or more tests with a type of function rather than a function. The determined test or tests can also take account of the characteristics required for the P-GW function such as possibly transmitted by the orchestration entity 10 in the step 301.

In the step 302, the test management entity 20 transmits to the orchestration entity 10 one or more tests that allows the hosting resources to be evaluated with respect to the requirements of the P-GW function. It should be noted that the method targets the installation of functions but it also aims to propose a mapping of the resources available, in terms of hosting resources, with respect to functions independently of the actual installation of the P-GW function. It may for example be appropriate to implement the method to evaluate the capacities of an infrastructure and more specifically of the hosting devices of this infrastructure to accommodate functions. The method can thus be implemented to evaluate partner infrastructures, to update an infrastructure, or to run an audit of an infrastructure upstream of an actual deployment for example.

Hereinafter in the description relating to FIG. 5, it is considered that just one test has been transmitted to the orchestration entity 10 by the management entity 20.

On reception of the test corresponding to the P-GW function, the orchestration entity 10 transmits a request for placement of the P-GW function to the control entity 30 of the P-GW function. The control entity 30 is, for example, an entity of VNFM (Virtual Network Function Manager) type. Such a function is responsible for the instantiation, the updating, and the ramping up of virtualized functions. In this example, the control entity 30 notably administers the functions of P-GW type and is responsible for instantiating the P-GW function in a communication infrastructure. The control entity thus receives, in the step 303, the function to be instantiated, the corresponding test or a datum relating to the test (identifier, executable file, etc.) to test a hosting device capable of accommodating it, and possibly characteristics relating to its installation. The installation of the virtualized function is given by the control entity 30 and executed by the management entity 40. According to one alternative, one and the same item of equipment can handle both the driving and installation missions.

To successfully complete this installation, the control entity 30 transmits to the management entity 40 of a communication infrastructure a request for determination of a hosting device located in the communication infrastructure capable of accommodating the virtualized function. The control entity 30 also transmits, to the management entity 40 of an infrastructure, the P-GW function to be installed and the test received from the orchestration entity and also, possibly, the installation characteristics relating to the P-GW function. According to one example, the entity 40 is an entity of VIM type. It should be noted that the control entity 30 can transmit the determination request to more than one management entity 40 notably to invoke distinct infrastructure providers or multiple management entities 40 of one and the same infrastructure.

The management entity 40, on reception of the determination request, determines hosting devices for installing the P-GW function by possibly taking account of the installation characteristics. According to one alternative, the management entity 40, based on the test and the characteristics received, in a step 305, evaluates a capacity required for the installation and obtains at least one variable corresponding to a result of the evaluation corresponding to a theoretical test. According to one example, the management entity obtains a computation capacity and/or a storage space required for the P-GW function. These variables correspond somewhat to theoretical data to be achieved for the hosting devices to be able to host the P-GW function. According to one example, the evaluation of a storage capacity required for the installation of the P-GW function corresponds to the following test:

the execution of a function $f(x,N)$, in which x is a random value and N is the size of a file F, the execution of a function $g(F)$ in which g is a function of permutation of n elements in F, the calculation of a variable z from the execution of a hash function on the n elements.

According to one alternative, the management entity 40 determines a duration T1 corresponding to a duration of execution of the evaluation, therefore to the elapsed time between the start of the evaluation and the obtaining of the variable. This time will be able to be used by the management entity to evaluate the resources made available by the virtualization entities invoked to conduct the tests and to decide between the virtualization entities that have equivalent test results.

In a step 306, the management entity 40 transmits to a virtualization entity 50, such as, for example, a hypervisor, a compatibility request comprising the test corresponding to the P-GW function determined initially by the test management entity 20. According to one alternative, it can be a datum relating to a test such as a test identifier or an executable file. Based on the type of datum, the virtualization entity 50 can associate the received datum with a test. In addition to the test itself, the compatibility request can, according to one alternative, comprise additional information relating to the evaluation conducted by the management entity 40 in the step 305. Thus, according to the evaluation executed by the management entity 40, the data relating to the file F, to the size N of the file F and to the random value x are transmitted with the functions f and g which correspond to the test. The virtualization entity 50 is then able to proceed with the examination of hosting devices for which it is responsible.

Thus, in the step 307, the virtualization entity 50 executes the received test on the hosting device 52 and obtains at least one variable, corresponding for example to a computation capacity, a storage space and a duration for performing the test. The test may require a communication 307a with the hosting device 52, notably according to the test to be performed. According to another example, the test performed on the hosting device 52 does not require an exchange with the device 52, notably if the entity 50 has sufficient information to execute the test. The hosting device is, for example, a virtual machine or a container, even a server. The virtualization entity 50 executes the following test, relating to a storage space for the P-GW function:

storage of the file F
execution of the function f(x, N)
execution of the function g(F)
obtaining of a variable y=h(g(F)) corresponding to a hash value.

In a step 308, the virtualization entity 50 transmits to the management entity 40 the variable y retained following the execution of the test and, according to one alternative, the value of the duration of execution of the test. The entity 50 transmits, according to this embodiment, the hash value y contained corresponding to the test of a storage space of the hosting device 52 for the P-GW function.

In the step 309, the management entity 40 determines if the hosting device 52 whose aptitude to host the P-GW function has been evaluated and has given rise to the value y can accommodate the P-GW function. The entity 40 can, according to one example, compare the value y with the variable z obtained from its own "theoretical" evaluation. The management entity 40 can also determine if a hosting device is more capable than another to accommodate the P-GW function by comparing the received variable y values and, possibly, the durations of execution of the tests received from one and the same virtualization entity or from distinct entities. Thus, the management entity can invoke as many virtualization entities, responsible for evaluating the aptitudes of hosting devices to accommodate the P-GW function, as necessary.

In steps 310, 311, 312 and 313 corresponding to the respective steps 306, 307, 308 and 309, the management entity 40 thus transmits a compatibility request to a virtualization entity 60 responsible for the hosting devices 51 and 53. The entity 40 obtains in return the values resulting from the execution of the respective tests of the device 51 and of the device 53 to host the P-GW function from the virtualization entity 60, testing one or more other hosting devices. The tests may require communications 311a and 311b between the virtualization entity 60 and the respective hosting devices 51, 53 depending on the test to be performed and the type of virtualization entity 60 concerned. The steps 310, 311, 312, 313 can be executed after or in parallel with the steps 306 to 309. If the management entity wants to be able to evaluate a hosting device more rapidly, a parallel invocation of the virtualization entities will be preferred.

According to a particular embodiment, in a step 314, the variable y being equivalent to the entity z, the management entity 40 selects a hosting device 52 tested by the virtualization entity 50 and transmits to the virtualization entity 50 a request for installation of the P-GW function on the hosting device 52. It should be noted that the different values collected by the management entity 40 and, possibly, the durations of execution of the tests allowing these variables to be obtained are possibly used for the purposes of auditing or mapping a communication infrastructure.

The virtualization entity 50 acknowledges the received installation request in a message transmitted in the step 315 and, in the step 316, installs the function on the hosting device 52 evaluated in the step 307. According to an alternative that is not represented, the installation can be performed by the control entity 30 following the reception of an installation message comprising information on the accommodating hosting device for the P-GW function to be installed.

On reception of the acknowledgement, the management entity 40 can itself, in the step 317, acknowledge the installation of the P-GW function on the hosting device 52 of the communication infrastructure to the control entity 30.

In relation to FIG. 6, an example of structure of a determination device is presented.

The determination device 400 implements the determination method, different embodiments of which have just been described.

Such a device 400 can be implemented in a management entity of a communication infrastructure, such as an entity of VIM type or of VNF Controller type.

For example, the device 400 comprises a processing unit 430, equipped for example with a microprocessor µP, and driven by a computer program 410, stored in a memory 420 and implementing the determination method according to the invention. On initialization, the code instructions of the computer program 410 are, for example, loaded into a RAM memory before being executed by the processor of the processing unit 430.

Such a device 400 comprises:
 a transmitter 402, capable of transmitting to a virtualization entity a compatibility request Comp comprising at least one datum relating to a test of a resource of the hosting device,
 a receiver 401, capable of receiving from the virtualization entity at least one first variable Var deriving from the test, relating to the transmitted datum, executed on the resource,
 a determination module 403, capable of determining the aptitude of a hosting device to accommodate the virtualized function as a function of the at least one first variable received.

In relation to FIG. 7, an example of structure of an examination device is presented.

The examination device 500 implements the examination method, different embodiments of which have just been described.

Such a device 500 can be implemented in an administration entity of a hosting device such as a virtual machine, a container or a server. The device can also be implemented in a hosting device. The device 500 can be instantiated in a fixed or mobile communication architecture.

For example, the device 500 comprises a processing unit 530, equipped for example with a microprocessor μP, and driven by a computer program 510, stored in a memory 520 and implementing the examination method according to the invention. On initialization, the code instructions of the computer program 510 are for example loaded into a RAM memory, before being executed by the processor of the processing unit 530.

Such a device 500 comprises:
- a receiver 501, capable of receiving from a management entity of the infrastructure a compatibility request Comp comprising at least one datum relating to a test of the resource,
- an execution module 503, capable of executing on the resource the at least one test relating to the received datum allowing at least one first variable to be obtained,
- a transmitter 502, capable of transmitting to the management entity the at least one first variable Var.

The invention claimed is:

1. A determination method for determining a hosting device of a network infrastructure of an operator for installation of a virtualized function, said virtualized function contributing to transmission and processing of at least one item of information relating to a service, the method being implemented by a determination device of said network infrastructure and comprising: transmitting to a virtualization entity on an examination device a compatibility request comprising at least one datum relating to a test of a resource of the hosting device, wherein the test evaluates a capability of the hosting device to be able to accommodate the virtualized function to be installed; receiving from the virtualization entity on the examination device at least one first variable deriving from the test, relating to the transmitted datum, executed on the resource; and determining an aptitude of the hosting device to accommodate the virtualized function as a function of the at least one first variable received.

2. The determination method as claimed in claim 1, further comprising obtaining at least one second variable from an evaluation of at least one capacity required for the installation of the virtualized function.

3. The determination method as claimed in claim 2, in which the at least one second variable comprises a duration corresponding to a duration of execution of the evaluation.

4. The determination method as claimed in claim 1, comprising transmitting to the virtualization entity on the examination device a request to install the virtualized function on the hosting device in response to the hosting device being determined to be capable of accommodating the virtualized function.

5. The determination method as claimed in claim 1, in which the at least one datum relating to the test is previously obtained from a control entity of the virtualized function.

6. The determination method as claimed in claim 1, in which the at least one datum relating to the test is specific to at least one characteristic of the virtualized function.

7. The determination method as claimed in claim 1, in which the resource of the hosting device relates to a storage space.

8. The determination method as claimed in claim 1, in which the resource of the hosting device relates to a computation capacity.

9. An examination method for examining a resource of a hosting device of a network infrastructure of an operator with a view to installation of a virtualized function, said virtualized function contributing to transmission and processing of at least one item of information relating to a service, the method being implemented by a virtualization entity on an examination device of said network infrastructure and comprising:
receiving from a determination device of the network infrastructure a compatibility request comprising at least one datum relating to a test of the resource, wherein the test evaluates a capability of the hosting device to be able to accommodate the virtualized function to be installed; executing on the resource the test relating to the received at least one datum allowing at least one first variable to be obtained; and transmitting to the determination device the at least one first variable.

10. The examination method as claimed in claim 9, in which the at least one first variable comprises a duration.

11. A device for determining a hosting device of a network infrastructure of an operator for installation of a virtualized function, said virtualized function contributing to transmission and processing of at least one item of information relating to a service, the device comprising:
a transmitter, which is configured to transmit to a virtualization entity on an examination device a compatibility request comprising at least one datum relating to a test of a resource of the hosting device, wherein the test evaluates a capability of the hosting device to be able to accommodate the virtualized function to be installed; a receiver, which is configured to receive from the virtualization entity on the examination device at least one first variable derived from the test, relating to the transmitted datum, executed on the resource; and a processor device configured to determine an aptitude of a hosting device to accommodate the virtualized function as a function of the at least one first variable received.

12. A device for examining a resource of a hosting device of a network infrastructure of an operator with a view to installation of a virtualized function, said virtualized function contributing to transmission and processing of at least one item of information relating to a service, comprising:
a receiver, which is configured to receive from a determination device of the network infrastructure a compatibility request comprising at least one datum relating to a test of the resource, wherein the test evaluates a capability of the hosting device to be able to accommodate the virtualized function to be installed; a processor device configured to execute on the resource the test relating to the received at least one datum allowing at least one first variable to be obtained;
and a transmitter, which is configured to transmit to the determination device the at least one first variable.

13. A non-transitory computer-readable storage medium, on which a program is stored comprising instructions for performing a method for determining a hosting device of a network infrastructure of an operator for installation of a virtualized function, when the instructions are executed by a processor of a determination device of said network infrastructure, said virtualized function contributing to transmission and processing of at least one item of information relating to a service, wherein the instructions configure the determination device to:
transmit to a virtualization entity on an examination device a compatibility request comprising at least one datum relating to a test of a resource of the hosting device, wherein the test evaluates a capability of the hosting device to be able to accommodate the virtualized function to be installed; receive from the virtualization entity on the examination device at least one first variable deriving from the test, relating to the transmitted datum, executed on the resource; and determine an aptitude of the hosting device to accommodate the virtualized function as a function of the at least one first variable received.

14. A non-transitory computer-readable storage medium, on which a program is stored comprising instructions for performing a method for examining a resource of a hosting device of a network infrastructure of an operator with a view to installation of a virtualized function, when the instructions are executed by a processor of a virtualization entity on an examination device of said network infrastructure, said virtualized function contributing to transmission and processing of at least one item of information relating to a service, wherein the instructions configure the virtualization entity on the examination device to: receive from a determination device of the network infrastructure a compatibility request comprising at least one datum relating to a test of the resource, wherein the test evaluates a capability of the hosting device to be able to accommodate the virtualized function to be installed; execute on the resource the test relating to the received at least one datum allowing at least one first variable to be obtained; and transmit to the determination device the at least one first variable.

* * * * *